United States Patent [19]
Wait et al.

[11] Patent Number: 4,862,682
[45] Date of Patent: Sep. 5, 1989

[54] CUTTING ASSEMBLY FOR HIGH-SPEED ROTARY GRASS TRIMMING DEVICE

[76] Inventors: Thomas R. Wait; Joseph J. DeMino, both of 9350 Longmeadow Cir., Boynton Beach, Fla. 33436; Bren R. Smith, 231 Peakview Dr., Rochester, N.Y. 14467

[21] Appl. No.: 167,993
[22] Filed: Mar. 14, 1988
[51] Int. Cl.[4] ............................................. A01D 34/68
[52] U.S. Cl. ........................................ 56/255; 56/295; 172/41
[58] Field of Search ...................... 172/15, 25, 41, 111; 56/295, 255, 12.7; 30/122, 276, 347, DIG. 5

[56] References Cited

U.S. PATENT DOCUMENTS

| | | | |
|---|---|---|---|
| 2,670,537 | 3/1954 | Campbell | 56/255 |
| 2,888,084 | 5/1959 | Trecker | 172/41 |
| 3,174,224 | 3/1965 | Rousselet | 172/25 |
| 3,395,521 | 8/1968 | Crockett | 56/295 |
| 3,686,841 | 8/1972 | Mager | 56/295 |
| 3,762,230 | 10/1973 | Steil | 56/255 |
| 3,938,249 | 2/1976 | Chacon | 172/15 |
| 4,213,504 | 7/1980 | Scheinder | 172/25 |
| 4,293,041 | 10/1981 | Holmstadt | 172/41 |
| 4,479,302 | 10/1984 | Richter | 30/122 |
| 4,501,332 | 2/1985 | Straayer | 30/122 |

Primary Examiner—Richard J. Johnson
Attorney, Agent, or Firm—Howard Greenwald

[57] ABSTRACT

A blade assembly for cutting herbaceous terrestrial vegetation at a cutting speed of from about 1,000 to about 10,000 revolutions per minute, wherein said blade assembly is comprised of a U-shaped blade which has a Rockwell C hardness of from about 37 to 40, a flare resistance of less than about 15 degrees, and a bending resistance of less than about 5 degrees, and wherein said U-shaped blade is an integral, symmetrical member comprised a vertically-extending left cutting edge, a vertically extending right cutting edge, and a rotating support member connected to said left and right cutting edges, wherein:

(a) said left cutting edge, said right cutting edge, and said rotating support member are integrally formed into a substantial U-shaped structure, (b) each of said left cutting and right cutting edges forms an angle with said rotating support member of from about 90 to about 95 degrees, (c) said U-shaped blade is from about 2.0 to about 15.0 inches long, from about 1.0 to about 3.0 inches wide; and (d) each of said left cutting edge and said right cutting edge is from about 1.0 to about 5.0 inches long.

7 Claims, 4 Drawing Sheets

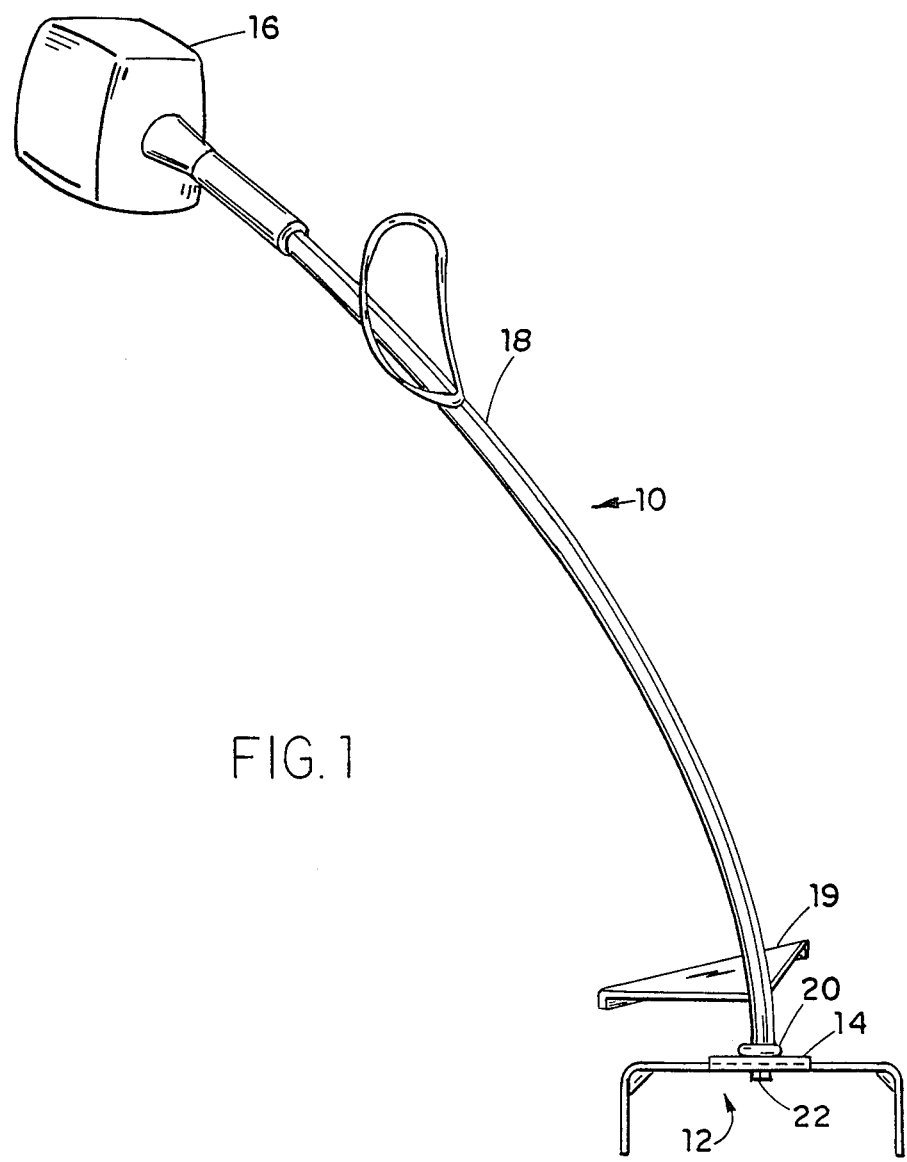

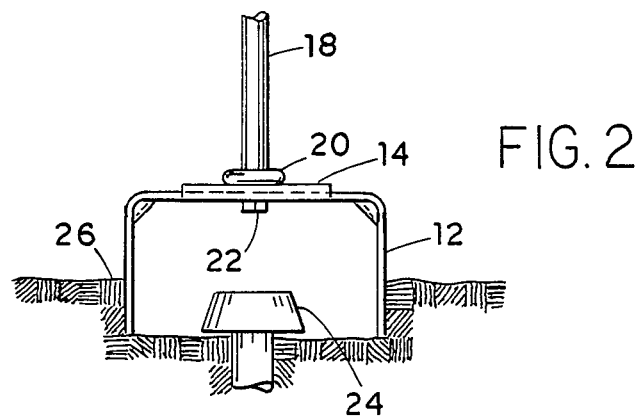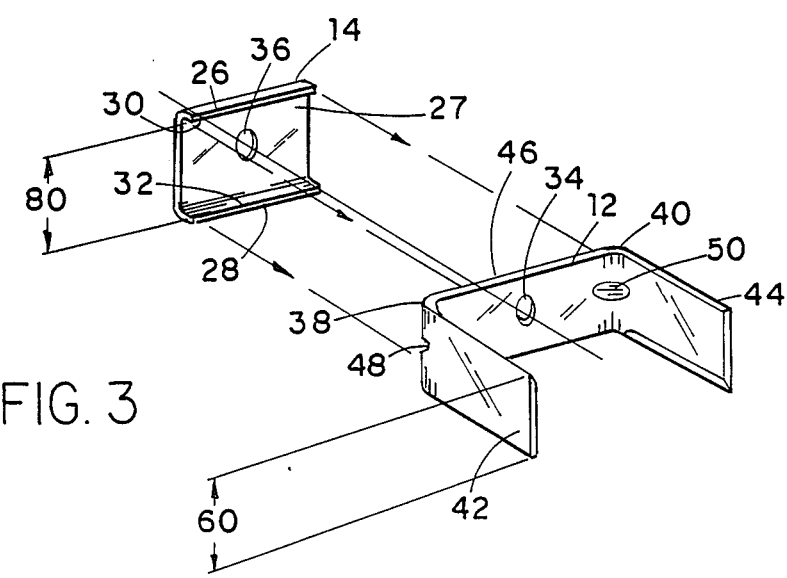

4,862,682

CUTTING ASSEMBLY FOR HIGH-SPEED ROTARY GRASS TRIMMING DEVICE

TECHNICAL FIELD

A blade assembly for cutting herbaceous terrestial vegetation (such as grass) with a high-speed rotary trimming device.

BACKGROUND OF THE INVENTION

Power operated rotary mowing and edging devices are well known in the prior art. Thus, for example, one such device is disclosed in U.S. Pat. No. 3,680,639 of Davis. The device of the Davis patent is stated to be useful as an edger and trimmer for use around embedded lawn sprinkler heads. The Davis device—and the other prior art rotary mowing and edging devices—suffer from several distinct disadvantages. In the first place, they are generally quite bulky and heavy and are difficult to carry over substantial distances and on hilly areas and inclines; they thus are not very suitable for trimming around the many sprinklers heads found on large golf courses. In the second place, such prior art devices are often expensive to purchase and operate. In the third place, such prior art devicers are often relatively slow.

In the past several years, a new class of rotary trimming devices has emerged. These devices, known as string trimmers and brushcutters, are often commonly referred to as "weedeaters." These string trimmers are high speed, inexpensive devices.

The string trimmer and brushcutter devices are not suitable for readily trimming around sprinkler heads. One could utilize such devices to cut around the periphery of the sprinkler head with these devices, but this would take an inordinate amount of time. Furthermore, the string device does not clear dirt and grass from the area around the outside diameter of the sprinkler head as efficiently as, e.g., a U-shaped blade would do so.

In order to provide a new sprinkler head trimming device by replacing the string cutting apparatus of the "weedeater" with a U-shaped cutting blade. Several problems are presented by this approach. If the blade is too heavy, then the relatively small motor of the "weedeater" will not be able to rotate it at high speeds. If the blade is too light, it will not have the physical properties required to maintain its dimensional stability and its cutting edge. If, as desired, the "weedeater" is operated at high speeds in order to maximize productivity, then the U-shaped blade is likely to flare and bend and, thus, become unacceptable for further use.

It is an object of this invention to provide a blade assembly which can readily be incorporated into a "weedeater" assembly, which can be operated at high speeds by the drive mechanism of the "weedeater" assembly, which when operated at such high speeds does not undergo a substantial amount of flaring and/or bending, and which, in conjunction with said assembly is especially suitable for trimming sprinkler heads on golf courses.

SUMMARY OF THE INVENTION

In accordance with this invention, there is provided a blade assembly for cutting herbaceous terrestrial vegetation at a cutting speed of from about 1,000 to about 8,000 revolutions per minute, wherein said blade assembly is comprised of a U-shaped blade which has a Rockwell C hardness of from about 37 to 40, a flare resistance of less than about 15 degrees, and a bending resistance of less than about 5 degrees, and wherein said U-shaped blade is an integral, symmetrical member comprised a vertically extending left cutting edge, a vertically extending right cutting edge, and a rotating support member connected to said left and right cutting edges, wherein: (a) said left cutting edge, said right cutting edge, and said rotating support member are integrally formed into a substantial U-shaped structure, (b) each of said left cutting and right cutting edges forms an angle with said rotating support member of from about 90 to about 95 degrees, (c) said U-shaped blade is from about 2.0 to about 15.0 inches long and from about 1.0 to about 3.0 inches wide; and (d) each of said left cutting edge and said right cutting edge is from about 1.0 to 5.0 inches long.

DESCRIPTION OF THE DRAWINGS

The present invention will be more fully understood by reference to the following detailed description thereof, when read in conjunction with the attached drawings, wherein like reference numerals refer to like elements and wherein:

FIG. 1 is a perspective view of a weed trimmer apparatus equipped with one of the preferred blade assemblies of this invention;

FIG. 2 is a cross-sectional, broken away view of the preferred blade assembly of FIG. 1 trimming the grass and dirt around a sprinkler head;

FIG. 3 is a perspective view illustrating how the a U-shaped blade and a support plate are joined to form the preferred blade assembly of FIG. 1;

DESCRIPTION OF THE PREFERRED EMBODIMENTS

Figure 5:
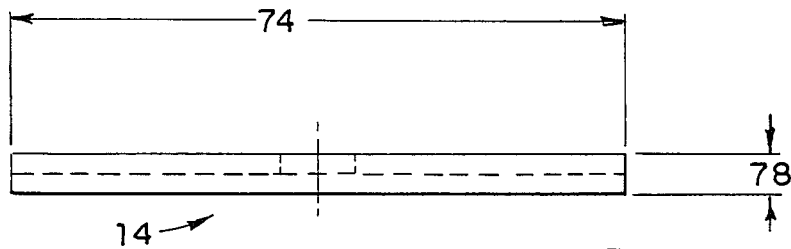
FIG. 5 is a cross-sectional view of the support plate of FIG. 3.

The blade assembly of this invention is especially useful with rotary mowers. Rotary mowers are well known to those skilled in the art. They are described, e.g., on pages 1339-1341 of "The Illustrated Science and Invention Encyclopedia," International Edition, Volume 10 (H.S. Stuttman Inc., Westport, Connecticut, 1983).

The blade assembly of this invention is especially suitable for use with "Weed Eater" rotary trimmer machines. The term "Weed Eater" is a registered mark owned by the Beaird-Poulan Company, and it is used to describe power driven trimmers and/or edges manufactured by Weed Eater, Inc.

Weed trimmers are well known to those skilled in the art. They are described, e.g., on pages 103-110 of Walter Hall's "Barnacle Parp's Guide to Garden & Power Tools (Rodale Press, Emmaus, Pa, 1983), the disclosure of which is hereby incorporated by reference into this specification.

In general, a weed trimmer will weigh from about 5 to about 25 pounds. For use with the blade assembly of this invention, the weed trimmer should preferably weigh from about 9 to about 25 pounds and, more preferably, from about 13 to about 25 pounds.

The weed trimmer may be powered either by electricity or an internal combustion engine. In either event, means for rotating the drive shaft usually has a horsepower rating of from about 1 to about 5 horsepower. The gasoline powered models usually have an engine size of from about 12 to about 86 cubic centimeters, although it is preferred to use models with an engine size of from about 18 to 33 cubic centimeters. The electric powered models usually are rated at from about 2 to about 5 amperes.

The weed eater apparatuses used with the blade assembly of this invention are capable of rotating it at a sustained speed of from about 1,000 to about 10,000 revolutions per minute for at least about 5 minutes; in normal use of these apparatuses, the high speed is usually not maintained for a period in excess of about 2 minutes. It is preferred that the weed eater apparatus rotate the blade assembly of this invention at a speed of from about 2,000 to about 4,000 revolutions per minute for a period not to exceed about 2 minutes.

The blade assembly of this invention generally weighs from about 0.3 pounds to about 1.5 pounds. It is preferred that the blade assembly weigh from about 0.5 to about 1.25 pounds.

The blade assembly of this invention, when used in conjunction with the weed eater, is useful for cutting herbaceous terrestrial vegetation. As used in this specification, the term "herbaceous" pertains or is characteristic of a herb as distinguished from a woody plant; it is to be understood, however, that although the blade assembly is useful for cutting herbaceous vegetation, it also can be used to cut woody plants with diameters not exceeding about 0.5 inch. The term "terrestrial," as used in this specification, refers to plants which live or grow on land (as opposed to aquatic plants).

As is well known to those skilled in the art, many herbaceous terrestrial plants grow in the grassland ecosystem; a description of this ecosystem is contained on pages 292-295 of the "McGraw-Hill Encyclopedia of Science and Technology," Volume 6 (McGraw-Hill Book Company, New York, 1977), the disclosure of which is hereby incorporated by reference into this specification.

Some examples of herbaceous terrestrial vegetation which the blade assembly of this invention is useful for cutting include, by way of illustration: grasses such as Bermuda grass, bent grass, crab grass, blue grass, and the like; dandelions; wildflowers; small saplings; milkweed; and the like.

The blade assembly of this invention is comprised of a U-shaped blade. In one embodiment, it consists of a U-shaped blade. In another embodiment, it consists of both a U-shaped blade and a U-shaped bracket.

The U-shaped blade of which the blade assembly is comprised has a Rockwell C hardness of from about 37 to about 40. As is known to those skilled in the art, the Rockwell C hardness of the blade can be measured by a Rockwell hardness tester. The Rockwell hardness tester is a machine which measures the hardness of metals and alloys in which a diamond-pointed cone is pressed under a specific load into the metal; the relative resistance to penetration (Rockwell hardness) is indicated by a number (Rockwell number) on a dial; the operation is called a Rockwell test. See, for example, Albert E. Long, "A Glossary of the Diamond-Drilling Industry," Bureau of Mines Bulletin 583 (1960), the disclosures of which is hereby incorporated by reference into this specification. Also see A. Nelson, "A Dictionary of Mining," (Philophical Library, Inc., New York, 1965), Emily Van Schoick, "Ceramic Glossary," (American Ceramic Society, Columbus, Oh, 1963), and E. Oberg et al.'s "Machinery's Handbook," Revised 21st Edition (Industrial Press, Inc., New York, 10157, 1981), the disclosures of each of which are hereby incorporated by reference into this specification.

The range of Rockwell C hardnesses which the U-shaped blade must posses is relatively narrow, ranging from about 37 to about 40. If the Rockwell hardness is too low, the U-shaped blade will have an unacceptable level of flare resistance and/or bending resistance when measured in accordance with the standard test described later in this specification. If the Rockwell C hardness is too high, the blade will fracture when operated at high speed in accordance with the standard test described above.

Referring to FIG. 1, a rotary grass-trimming device 10 is illustrated. Grass-trimming device 10 is comprised of means for rotating U-shaped blade 12 and support plate 14 at a cutting speed of from about 1,000 to about 10,000 revolutions per minute. Power is supplied by motor 16 through shaft (not shown) inside of frame 18 and to end plate 20 of the shaft. The U-shaped blade 12 and the support plate 14 are connected to end plate 20 by bolt 22.

Bolt 22 is the same bolt (or the same stud and nut combination) provided with the Weed Eater apparatus and used to secure the spool of nylon thread (not shown) to the end plate 20. To attach the blade assembly to the Weed Easter, bolt 22 is removed, the spool of nylon thread is removed, the blade assembly is put in its place, and the blade assembly is then secured to the Weed Eater end plate 20.

Referring to FIG. 2, a broken away view of the apparatus of FIG. 1 being used to trim an in-ground pop-up sprinkler head 24 is shown. The sprinkler head is referred to as "pop-up" because, when the water to it is turned on, sprinkler head 24 pops up until it is higher than the ground 26. It is preferred, when using the blade assembly of this invention, that the sprinkler head around which the ground and vegetation is to be trimmed is not in its pop up condition.

FIG. 3 illustrates how, in one embodiment of the blade assembly of this invention, both a U-shaped blade 12 and a support plate 14 are attached to end plate 20. In another embodiment, not shown, only U-shaped blade 12 is attached to the end-plate 20.

Referring to FIG. 3, it will be seen that support plate 14 is also U-shaped and is comprised flanges 26 and 28 which, when support plate 14 is placed over and aligned with U-shaped blade 12, straddle and reinforce U-shaped blade 12. The distance between the interior surface 30 of flange 26 and the interior surface 32 of flange 28 is such that support plate 14 tightly fits over U-shaped blade 12. In general, the distance between interior surface 30 and 32 is from about 0.5 to about 10 percent larger than the width of U-shaped blade 12 and, preferably, about from 1.0 to about 2.0 percent larger than said blade width.

Each of U-shaped blade 12 and support plate 14 contains orifices 34 and 36, respectively, through which bolt 22 (not shown) and stud and nut (not shown) are inserted and screwed into end plate 20.

In the preferred embodiment illustrated in FIG. 3, U-shaped blade 12 coined an the intersection 38 and 40, respectively of its left cutting edge 42 and its right cutting edge 44 with its rotating support member 46; the coined surface is indicated at points 48 and 50. As those skilled in the art are aware, coining is a restriking operation used to sharpen or change an existing radius or profile; see, e.g., the glossary included in "American Society for Metals. Metals Handbook, Volume 1 Properties and Selection of Metals" (Metals Park, Oh, 8th edition, 1961), the disclosure of which is hereby incorporated by reference into this specification.

In the embodiment illustrated in FIG. 3, it is preferred that the depth of each of coins 48 and 40 be from about 0.13 inches to about 0.50 inches and, more preferably, from about 0.19 inches to about 0.44 inches. In the most preferred embodiment, the depth of each of coins 48 and 40 is from about 0.25 inches to about 0.38 inches.

Without wishing to be bound to any particular theory applicants believe that the preferred coining operation increases the flare resistance of the blade such that the angle between the left and right cutting edges and the rotating support member is limited to 15 degrees of flare (when tested at 4000 r.p.m. for 2 minutes). It is believed that the coining increases the flare resistance by effectively adding a support rib between the left and right cutting edges and the rotating support member. The rib increases the bending resistance of the metal by making the metal stronger between the left and right cutting edges and the rotating support member.

Figure 4:
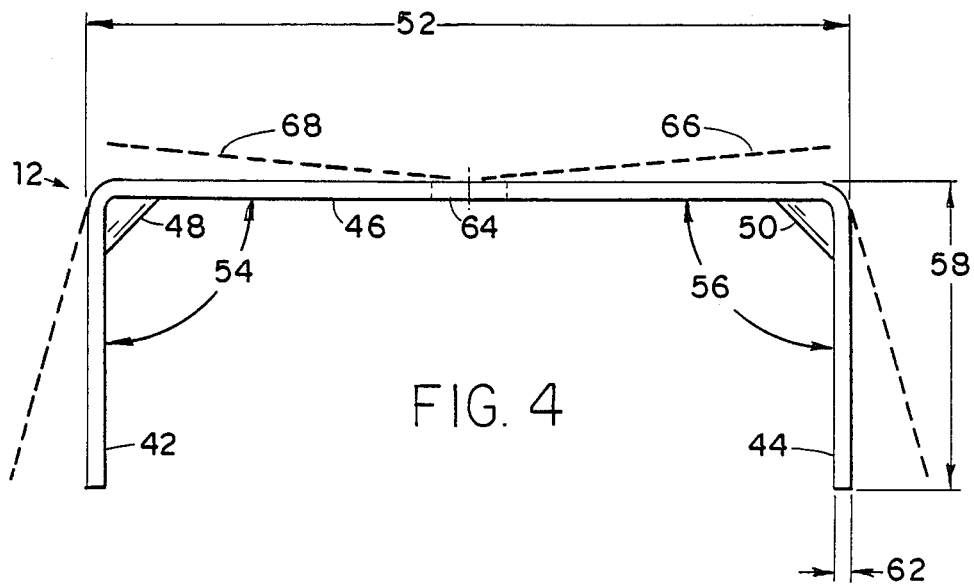
FIG. 4 is a cross-sectional view of the U-shaped blade of FIG. 3.

FIG. 4 is a cross-section of U-shaped blade 12. Referring to FIG. 4, the length 52 of U-shaped blade 12 is from about 2.0 to about 14.0 inches long. It is preferred that the length 52 of U-shaped blade 12 be from about 3.0 to about 12.0 inches. In the most preferred embodiment, the length 52 is from about 4.0 to about 11.0 inches.

As indicated above, U-shaped blade 12 is comprised of vertically-extending left cutting edge 42, vertically-extending right cutting edge 44, and horizontally-extending rotating support member 46; members 42, 44, and 46 are integrally formed, producing a one-piece, substantially U-shaped blade 12. The angle 54 formed between members 42 and 44 is from about 90 to about 95 degrees. The angle 56 formed between members 44 and 46 is from about 90 to about 95 degrees. Although angles 54 and 56 may be substantially indentical, they need not be.

Each of left cutting edge 42 and right cutting edge 44 has a length 58 of from about 1.0 to about 5.0 inches long; although they may be of substantially the same length, they need not be. It is preferred that each of cutting edges 42 and 44 be from about 2.0 to about 4.0 inches long. The most preferred length for these cutting edges is about 3.0 inches.

Referring again to FIG. 3, the width 60 of U-shaped 12 is from about is from about 1.0 to about 3.0 inches. It is preferred that width 60 be from about 1.25 to about 2.25 inches. In an even more preferred embodiment, width 60 is about 1.5 inches.

The thickness 62 of U-shaped blade 12 is from about 0.093 inches to about 0.18 inches. It is preferred that thickness 62 be from about 0.1 to about 0.15 inches.

The blade assembly of this invention has a specified resistance to flare, bending, and fracture when tested in accordance with the test specified below. In this test, it is first determined whether the blade assembly is comprised of only blade 12 or of both blade 12 and plate 14; if the assembly only comprised of blade 12, then this blade is tested for the flare, bending and fracture resistance, and the results are reported for the blade; if, on the other hand, the assembly comprises both blade and plate, then this combination is then tested, and the results are reported for the combination.

A specified Weed Eater is used in this test. Homelite gas-powered model number HK-33 (which has a 33.33 cubic centimteter engine, a straight drive shaft, and weights 18.75 pounds) is used. The spool of nylon wire is removed from the machine by removing bolt 22. U-shaped blade 12 is measured to determine angles 54 and 56; furthermore, rotating support member 46 is examined to insure that it is unbent. Thereafter, the blade assembly (be it comprised of either blade 12 or of both blade 12 and plate 14) is secured to the Weed Eater by bolt 22, and the Weed Eater is then operated at a speed of 4,000 revolutions per minute for 2 minutes. Thereafter the blade assembly is removed from the Weed Eater, and the angles between members 42 and 46 and 44 and 46 are then measured. If the angle between these members after the test is no greater than 15 degrees than the angle between these members before the test, the blade assembly is said to have the required degree of flare resistance.

Figure 6:
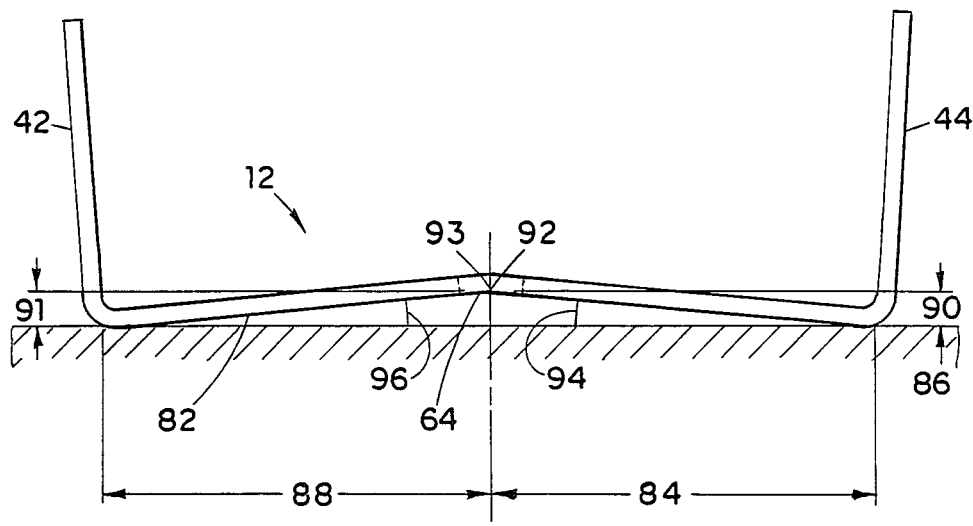
FIG. 6 is a schematic of a blade of this invention.

Referring to FIG. 6, the blade 12 is also examined after the test to determine whether it has bent up from midpoint 64. The blade is placed upon an inspection table 82 with cutting edges 42 and 44 pointing up. Dimension 84 is measured from midpoint 64 to point 86 (where the right hand side of the blade rests upon table 82). In a similar manner, dimension 88 is determined. Dimensions 90 and 91 are determined by measuring from table 82 to points 92 and 93. If neither angle 94 or 96 is greater than 5 degrees, then the blade has the required amount of bending resistance.

One preferred embodiment of the support plate is illustrated in FIG. 5. Support plate is U-shaped and is comprised of a left, vertically-extending plate member, a right vertically extending plate member, and integrally joined to said left and right vertically-extending plate members a horizontally extending plate support member. Referring to FIG. 3, the left, vertically-extending plate member is 28, the right vertically extending plate member is 26, and the horizontally extending plate member integrally joined members 28 and 26 to form a U-shaped structure is member 27.

Referring again to FIG. 5, the length 74 of support plate 14 is from about 1.0 to about 13.0 inches and, preferably, is from about 2.0 to about 11.0 inches. However, length 74 of support plate 14 is from about 0.5 to about 1.0 as times long as is length 52 of U-shaped blade 12. It is preferred that length 74 be from about 0.6 to about 0.9 times as long as length 52.

Referring again to FIG. 3, the overall width of support plate 14 (measured from the outside of flange 26 to the outside of flange 28) will be from about 1.25 to about 3.25 inches. In general, the width of support plate 14 is from about 0.25 inches to about 0.38 inches wider than width 60 of U-shaped blade 12.

Referring again to FIG. 5, the height 78 of support blade 14 is from about 0.19 to about 0.38 inches.

The U-shaped blade of this invention may be made in accordance with the following general procedure:

1. The base material (stock) is purchased to the desired width, usually from about 1.0 to about 3.0 inches wide and from about 6.0 to about 8.0 feet long.

2. The base material (stock) is cut off to the desired length, usually from about 4.0 inches to about 25 inches long.

3. The center mounting hole is pierced into the steel at an equal distance from the sides of from about 0.5 to about 1.5 inches and an equal distance from the ends of from about 2 to about 12.5 inches.

4. The two cutting edges are then machined to produce a sharp cutting edge of from about 0.5 to about 4.5 inches long.

5. The left vertically-extending and right vertically-extending cutting edges are formed by bending the cutting edges at a 90 degree angle from the rotating support member at a distance of from about 1.0 to about 5.0 inches in from both ends. The coining of the support ribs is produced as an integral operation with the forming of the left and right cutting edges. The coining is from about 0.125 to about 0.5 inches deep.

6. The blade is heat-treated to produce its flare, bend, and wear resistance properties. The blade is heated in a furnace at a temperature of from about 1,400 degrees Fahrenheit to about 1,600 degrees Fahrenheit for from about 0.5 to about 1.5 hours.

7. The preheated blade is then quenched in an oil bath until it is cooled down to room temperature.

8. The blade is then heated again in a furnace for from about 1.5 to about 2.5 hours at a temperature of from about 700 to about 900 degrees Fahrenheit to obtain a Rockwell C hardness of from about 35 to about 45.

9. Finally, the blade is soaked in a black oxide salt bath at a temperature of from about 250 to about 300 degrees Fahrenheit for about 0.5 to about 1.0 hours. The black oxide coating is applied to prevent rusting.

In one preferred embodiment, the base material (stock) is purchased to a width of 1.5 inches by 8 feet long. The base material (stock) is then cut off to a length of 14.12 inches. The center mounting hole is then pierced into the steel at 0.75 inches from the side and 7.06 inches from the end. The two cutting edges are machined to produce a sharp cutting edge of 2.25 inches long on both ends. The left vertically-extending and right vertically-extending cutting edges are formed by bending the cutting edges at a 90 degree angle from the rotating support member at a distance of 2.81 inches in from both ends; the coining of the support ribs are produced as an integal operation with the forming of the left and right cutting edges; the coining is 0.25 inches deep. The blade is heat treated in a furnace of 1550 degrees F. for 0.75 hours. Thereafter, the preheated blade is then quenched in an oil bath until it is cooled down to room temperature. The blade is then reheated in a furnace to 800 degrees Fahrenheit to obtain a Rockwell C hardness of from 37 to 40. Finally, the blade is soaked in a black oxide salt bath at 290 Fahrenehit for 0.75 hours.

In one preferred embodiment, the cutting assembly of this invention is comprised of U-shaped support member 14. Support plate 14 may be made in accordance with the following general procedure:

1. The base material (stock) is purchased to the desired width of from about 1.5 to about 3.5 inches wide and from about 6 to about 8 feet long.

2. The base material (stock) is cut off to the desired length of from about 1.0 to about 14.0 inches long.

3. The center mounting hole is pierced into the steel at an equal distance from the sides of from about 0.75 to about 1.75 inches and an equal distance from the ends of from about 0.5 to about 14.0 inches.

4. The left and right flanges on the support plate are formed at 90 degrees to the center support body at a length of from about 0.06 to about 0.19 inches.

5. Finally, the support plate is soaked in a black oxide salt bath at about 250 to about 300 degrees Fahrenheit for from about 0.5 to about 1.0 hours. The black oxide coating will help to prevent rusting.

In one preferred embodiment for making support plate 14, the base material (stock) is purchased to a width of 2.0 inches by 8 feet long. The base material (stock) is then cut off to a length of 3.0 inches. The center mounting hole is pierced into the steel at 1.0 inches from the side and 1.5 inches from the ends. The left and right flanges are then formed at a 90 degree angle to the center support body at a length of 0.12 inches. Finally, the plate is soaked in a black oxide salt bath at 290 degrees Fahrenheit for 0.75 hours.

It is preferred that both U-shaped blade 12 and support blade 14 be made from carbon steel. Support plate 14 is preferably made out of a low-carbon cold-rold steel with a carbon content of from about 0.20 to about 0.25 percent; suitable such steels include SAE 1020, 1021, 1023, 1024, 1025, and the like, the properties of which are described in pages 2062 to 2127 of Oberg et al.'s "Machinery's Handbook," Revised 21st Edition (Industrial Press Inc., New York, 1981), the disclosure of which is hereby incorporated by reference into this specification.

U-shaped blade 12 is preferably made out a high-carbon steel with a carbon content of from about 0.55 to about 0.95 percent. Suitable such steels include SAE 1060, 1070, 1080, 1090, and the like, which steels are described in the aforementioned Oberg book (see, e.g., pages 2109–2110 therof). One high-carbon steep particularly preferred for use in U-shaped blade 12 is SAE 1070.

In one preferred embodiment, U-shaped blade 12 is a coined, integral symmetrical member. As used in this specification, the term symmetrical means that there is substantially the same amount of weight on both sides of orifice 34 to the ends of the blade. In one embodiment, the blade has the same dimensions on both sides of the orifice. In another embodiment, the blade has different dimensions on both sides of the orifice. In both of these preferred embodiments, however, the weight of the blade is substantially the same on both sides of the orifice.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A blade assembly for cutting herbaceous terrestial vegetation at a cutting speed of from about 1,000 to about 10,000 revolutions per minute, wherein said blade assembly is comprised of a U-shaped blade which has a Rockwell C hardness of from about 37 to 40, a flare resistance of less than about 15 degrees, and a bending resistance of less than about 5 degrees, and wherein said U-shaped blade is an integral, symmetrical member comprised of a sharpened, vertically-extending left cutting edge, a sharpened, vertically-extending right cutting edge, and a rotating support member connected to said left and right cutting edges, wherein:

(a) each of said left cutting edge and said right cutting edge is integrally connected to said rotating support member, thereby forming an integral, substantially U-shaped structure, (b) each of said left cutting and right cutting edges forms an angle with said rotating support member of from about 90 to about 95 degrees at the point at which each of said cutting edges is connected to said rotating support member.
(c) said U-shaped blade is from about 2.0 to about 14.0 inches long, from about 1.0 to about 3.0 inches wide, and from about 0.093 to about 0.18 inches thick,
(d) each of said left cutting edge and said right cutting edge is from about 1.0 to about 5.0 inches long;
(e) said U-shaped blade is coined at each of the intersections of its left cutting edge and its right cutting edge with its rotating support member;
(f) said rotating support member is the only means connecting said left cutting edge and said right cutting edge; and
(g) said left cutting edge, said right cutting edge, and said rotating support member define a U-shaped space which is unobstructed by any means connected to said U-shaped blade.

2. A blade assembly for cutting herbaceous terrestial vegetation at a cutting speed of from about 1,000 to about 10.000 revolutions per minute, wherein said blade assembly is comprised of a U-shaped blade and a support plate operatively connected to said U-shaped blade, wherein said U-shaped blade has a Rockwell C hardness of from about 37 to about 40, a flare resistance of less than about 15 degrees, and a bending resistance of less than about 5 degrees, and wherein said U-shaped blade is an integral, symmetrical member comprised of a vertically-extending left cutting edge, a vertically extending right cutting edge, and a rotating support member connected to said left and right cutting edges, wherein:
(a) said left cutting edge, said right cutting edge, and said rotating support member are integrally formed into a substantial U-shaped structure;
(b) each of said left cutting edge and said right cutting edge forms an angle with said rotating support member of from about 90 to about 95 degrees;
(c) said U-shaped blade is from about 2.0 to about 14.0 inches long and from about 1.0 to about 3.0 inches wide;
(d) each of said left cutting edge and said right cutting edge is from about 1.0 to about 3.0 inches wide;
(e) said support plate is U-shaped and is comprised of a left, vertically extending plate member, a right, vertically extending plate member, and integrally joined to said left and right vertically extending plate members a horizontally-extending plate support member;
(f) each of said U-shaped blade and said support plate consist essentially of carbon steel, wherein said U-shaped blade consists essentially of high-carbon steel with a carbon content of from about 0.55 to about 0.95 percent;
(g) said U-shaped blade is coined at each of the intersections of its left cutting edge and its right cutting edge with its rotating support member;
(h) the width of said horizontally-extending plate support member is from about 1.0 percent to about 2.0 percent larger than the width of said U-shaped blade;
(i) said blade assembly weighing from about 0.3 to about 1.5 pounds;
(j) each of said U-shaped blade and said U-shaped support plate contain at least one orifice; and
(k) said U-shaped blade and said U-shaped support plate are operatively connected to each other by a bolt passing through at least one orifice in each of said members.

3. The blade assembly as recited in claim 2, wherein the depth of each of said coins is from about 0.3 to about 0.50 inches.

4. The blade assembly as recited in claim 3, wherein the depth of each of said coins is from about 0.19 to about 0.44 inches.

5. The blade assembly as recited in claim 4, wherein the depth of each of said coins is from about 0.25 to about 0.38 inches.

6. The blade assembly as recited in claim 5, wherein said U-shaped blade is from about 3 to about 12 inches long.

7. The blade assembly as recited in claim 6, wherein said U-shaped blade is from about 4 to about 11 inches long.

* * * * *